United States Patent Office 3,026,305
Patented Mar. 20, 1962

3,026,305
VULCANIZATION OF POLYMERS AND CO-
POLYMERS OF EPICHLOROHYDRIN
Anderson E. Robinson, Jr., Wilmington, Del., assignor to
Hercules Powder Company, Wilmington, Del., a corporation of Delaware
No Drawing. Filed Feb. 10, 1960, Ser. No. 7,776
24 Claims. (Cl. 260—79.5)

This invention relates to special purpose rubbers and more particularly to vulcanizates produced by cross-linking polymers of an epihalohydrin.

For many rubber applications specialty rubbers are required and no one rubber has previously been known that had the requisite physical properties that it could be employed widely in such applications. For example, if it had solvent resistance, it lacked high or low temperature resistance, etc.

Now, in accordance with this invention, it has been found that high molecular weight polymers and copolymers of epihalohydrins can be vulcanized, i.e., cross-linked, by heating in the presence of an amine and at least one other agent selected from the group consisting of sulfur, dithiocarbamates, thiuram sulfides and thiazoles to produce rubbers that have the good attributes of a number of the so-called specialty rubbers and hence, can be used in diverse specialty rubber applications.

Any high molecular weight polymer, homopolymer or copolymer, of an epihalohydrin, as, for example, epichlorohydrin or epibromohydrin homopolymers, copolymers of two different epihalohydrins, or copolymers of an epihalohydrin with one or more other epoxides can be cross-linked to produce the new vulcanizates of this invention. These polymers are readily prepared by polymerization of epihalohydrins with, for example, organo-aluminum compounds as catalysts. Particularly effective catalysts for the polymerization of epihalohydrins are alkylaluminum compounds that have been reacted with from about 0.2 to about 1 mole of water per mole of alkylaluminum compound. The polymer obtained by means of these catalysts may be essentially wholly amorphous or crystalline or it may be a mixture of the amorphous and crystalline polymers. Generally, the amorphous polymers provide the most rubbery vulcanizates, the crystalline polymers on vulcanization tending to be hard, brittle and lacking in elasticity. These properties are, of course, useful in the case of relatively rigid molded articles which can be prepared by molding the compounded polymer and then curing to cross-link and set it. However, excellent rubbers are obtained by vulcanizing mixtures of amorphous and crystalline polymers. In this case, the amount of the crystalline polymer is generally less than about 25 to 30% of the mixture.

When epihalohydrins are polymerized by the above process, polymerization takes place, at least in major part, through the epoxide linkage so that the product is a polyether containing halomethyl groups attached to the main polymer chain. The homopolymers are believed to have the following general formula:

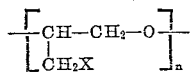

where X is halogen. In the same way, when an epihalohydrin is copolymerized with one or more other epoxides (including other epihalohydrins), polymerization takes place through the epoxide linkage even though other polymerizable groups may be present. Typical of epoxides that can be copolymerized with an epihalohydrin to produce a copolymer that can be cross-linked in accordance with this invention are the alkyleneepoxides such as ethylene oxide, propylene oxide, butene oxides, etc., butadiene monoxide, cyclohexene oxide, vinyl cyclohexene oxide, epoxy ethers such as ethyl glycidyl ether, 2-chloroethyl glycidyl ether, hexyl glycidyl ether, allyl glycidyl ether, etc.

As pointed out above, the polymers of an epihalohydrin that are vulcanized or cross-linked in accordance with this invention are high molecular weight polymers. Any homopolymer or copolymer that has a reduced specific viscosity of at least about 0.2, as measured on a 0.1% solution in α-chloronaphthalene at 100° C., can be cross-linked with the agents of this invention to yield a polymer of increased tensile strength and modulus. The term "reduced specific viscosity" (RSV), which is a function of molecular weight, is used herein to designate the specific viscosity measured at 100° C. on an α-chloronaphthalene solution of the polymer, containing 0.1 gram per 100 ml. of solution, divided by the concentration of the solution. Polymers having an RSV above about 0.2 and preferably above about 0.5 on cross-linking yield excellent rubbery polymers that, as pointed out above, can be used as general purpose specialty rubbers.

These poly(epihalohydrin)s and epihalohydrin copolymers are cross-linked by heating a mixture of the polymer, an amine and at least one agent selected from the group consisting of sulfur, dithiocarbamates, thiuram sulfides and thiazoles. Preferably cross-linking is accomplished by heating a mixture of the polymer, an amine, sulfur and either a dithiocarbamate, a thiuram sulfide or a thiazole. The effect of sulfur in the latter embodiment is particularly pronounced when the third agent is a thiazole.

Any dithiocarbamate, i.e., a metal, ammonia or amine salt of dithiocarbamic acid and its alkyl or cycloalkyl substituted derivatives, can be used in combination with an amine or an amine and sulfur to cross-link an epihalohydrin polymer. Exemplary of the dithiocarbamates that can be used are zinc dimethyldithiocarbamate, tellurium diethyldithiocarbamate, piperidinium pentamethylene dithiocarbamate, etc.

Any alkyl thiuram sulfide, i.e., a compound having the general formula:

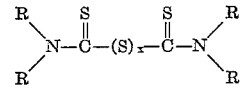

where x is an integer of not less than 1 and R is hydrogen or alkyl, preferably methyl or ethyl, with at least one R on each nitrogen being alkyl, can be used in combination with an amine or an amine and sulfur to cross-link an epihalohydrin polymer. Exemplary of the thiuram sulfides that can be used are symmetrical dimethyl thiuram disulfide, tetramethyl thiuram monosulfide, tetramethyl thiuram disulfide, tetramethyl thiuram tetrasulfide, tetraethyl thiuram monosulfide, tetraethyl thiuram disulfide, etc.

Any thiazole, but preferably a benzothiazole, i.e., a compound having the general formula:

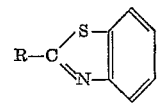

where R is hydrogen, alkyl, alkyl mercaptan, —SH or

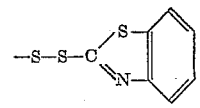

can be used in combination with an amine or an amine and sulfur to cross-link an epihalohydrin polymer. Exemplary of the thiazoles that can be used are benzothiazole, 2-mercaptobenzothiazole, 2-methyl mercaptobenzothiazole, 2-ethyl benzothiazole, 2-benzothiazyl disulfide, etc.

The above agents are effective as cross-linking agents for epihalohydrin polymers only when used in combination with an amine. Any amine can be used for this purpose including primary, secondary, and tertiary amines, monoamines and polyamines. Exemplary of amines that can be employed are the rosin amines such as dehydroabietylamine, abietylamine, dihydroabietylamine, tetrahydroabietylamine and the commercial mixtures of these amines, phenyl-β-naphthylamine, aniline, tributylamine, triethylamine, triethanolamine, poly(2-methyl-5-vinylpyridine), piperidine, piperazine, collidine, lutidine, ethylenediamine, hexamethylene-diamine, p-phenylenediamine, o-hydroxybenzyl-N,N-dimethylamine, dicyclohexylamine, dicyclohexylethylamine, etc. Instead of the free amine, a salt of the amine can be used as, for example, the hydrogen halides, in which case an alkaline material, such as calcium or barium oxide, must also be added to form an amine in situ. Internal salts of the amines can also be used as, for example, hexamethylenediamine carbamate, which type of salt decomposes to the free amine at or below the curing temperature.

Varied amounts of the various cross-linking agents can be added and the optimum amount of each cross-linking agent will depend upon the degree of cross-linking desired, the nature of the other cross-linking agents employed, etc. Generally, the amounts added (based on the weight of the polymer) will be within the following ranges: dithiocarbamate, thiuram sulfide and thiazole from about 0.1% to 10% and preferably from about 0.5% to 5%; sulfur from about 0.1% to 10% and preferably from about 1.0% to 5%; and amine from about 0.5% to 20% and preferably from about 2% to 10%.

The cross-linking agents can be incorporated or admixed with the polymer in any desired fashion. For example, they can be uniformly blended with the polymer by simply milling on a conventional rubber mill. By this means the agents are uniformly distributed throughout the polymer and uniform cross-linking is effected when the blend is subjected to heat. It is generally preferable to use cold roll milling procedures as, for example, with the rolls cooled to about 50° F. Other methods of admixing the cross-linking agents with the polymer will be apparent to those skilled in the art.

The temperature at which the cross-linking is effected can be varied over a wide range. It can be effected in minutes at temperatures around 300° F. or in days at room temperature. In general, the cross-linking temperature will be within the range of from about 250° F. to about 340° F. and preferably from about 280° F. to about 320° F. and the time, which will vary inversely with the temperature, will range from about 5 to about 90 minutes and preferably from about 20 minutes to about 45 minutes.

In addition to the cross-linking agents, other ingredients can also be incorporated. The additives commonly used in rubber vulcanization can be used here also, as, for example, extenders, fillers, pigments, plasticizers, etc. The presence of a filler, and in particular carbon black, is beneficial and, as in rubber compounding, gives optimum results. Obviously, there are many cases in which a filler is not required or desired and excellent results are achieved when only the cross-linking agents are added. Certain metal oxides such as zinc oxide or magnesium oxide can be substituted for part but not all of the amine component. It is thought that they improve the efficiency with which the amine is utilized by partially freeing the amine from the role of acid acceptor.

The following examples will illustrate the process of cross-linking epihalohydrin polymers in accordance with this invention and the vulcanizates so obtained. All parts and percentages are by weight.

TYPICAL PREPARATION OF POLYMER

A polymerization vessel equipped with a stirring device and free of air was charged under nitrogen with n-heptane and 15 parts of epichlorohydrin. After equilibrating the vessel and contents at 30° C. injection of the catalyst solution was begun. The catalyst solution was prepared by diluting a 1 molar solution of triethylaluminum in n-heptane to 0.5 molar with ether. Water in an amount equal to 0.6 mole of water per mole of triethylaluminum was then added and the solution was agitated at 30° for about 16 hours. An amount of this catalyst solution equal to 4 millimoles was injected into the polymerization mixture in 4 equal portions at 0.5 hour intervals. The resultant reaction mixture diluent was 85% n-heptane and 15% ether. After 19 hours at 30° C. the polymerization was stopped by adding 4 parts of anhydrous ethanol and the reaction mixture was diluted with about 50 parts of diethyl ether. The ether-insoluble polymer was separated, washed twice with ether and dried. This product was a mixture of crystalline and amorphous poly(epichlorohydrin). The amorphous fraction was isolated by extraction with acetone [32 parts of acetone per part of poly(epichlorohydrin)] at room temperature for about 16 hours, concentrating the extract until viscous and then precipitating the amorphous polymer therefrom by adding an equal volume of methanol containing 0.2% of the antioxidant 4,4'-thiobis(6-tert-butyl-m-cresol). The polymer so isolated was then washed with an additional amount of the percipitant and dried. On analysis it was found to contain about 5% crystalline poly(epichlorohydrin). It had an RSV of 2.8.

GENERAL PROCEDURE FOR PREPARATION OF VULCANIZATES

Polymer stocks were made up by mixing on a two-roll mill (rolls cooled to about 50° F.) 100 parts of polymer with the specified cross-linking agents and any other additives for about 5 minutes. The stocks were then cross-linked by heating at 300°–310° F. for 40 minutes. The extent of cross-linking was determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the tightness of cross-linking.

The percent gel and percent swell are determined as follows: a weighed cylindrical sample of polymer weighing about 100 mg. is soaked in an excess of toluene (30 cc.) in a closed container for 48 hours. The sample is then removed, blotted on filter paper without squeezing so as to remove toluene on the surface and weighed at once. The swollen sample is then dried in a current of air at room temperature over a 72-hour period to constant weight. The weights of initial and final sample are corrected for nonpolymer content based on knowledge of components. From these figures:

$$\frac{\text{corrected dry weight}}{\text{corrected initial weight}} \times 100 = \text{percent gel}$$

Similarly percent swell is calculated by the formula:

$$\frac{\text{corrected swollen weight} - \text{corrected dry weight}}{\text{corrected dry weight}} \times 100 = \text{percent swell}$$

*Examples 1–4*

In these examples poly(epichlorohydrin) was milled and cross-linked (vulcanized) with an amine and one or more other agents, and the extent of vulcanization compared with controls wherein the amine or other agents were omitted. The amounts of the ingredients (by parts) in each formulation along with the percent gel and percent swell of each vulcanizate are given in Table I. The designation of infinity (∞) for percent swell in the table means that the composition was completely dissolved, indicating that no cross-linking had occurred.

TABLE I

| | Controls | | | Examples | | | |
|---|---|---|---|---|---|---|---|
| | a | b | c | 1 | 2 | 3 | 4 |
| Poly(epichlorohydrin) (RSV-2.8) | 100 | 100 | 100 | 100 | 100 | 100 | ---- |
| Poly(epichlorohydrin) (RSV-1.4) | ---- | ---- | ---- | ---- | ---- | ---- | 100 |
| Rosin Amine D [1] | ---- | 10 | ---- | 10 | 5 | 5 | 10 |
| Tri-n-butylamine | ---- | ---- | ---- | ---- | ---- | ---- | ---- |
| Sulfur | ---- | ---- | 5 | 5 | 5 | ---- | 2 |
| Tetramethylthiuram disulfide | ---- | ---- | 2.5 | 2.5 | 2.5 | 2.5 | ---- |
| Tellurium diethyldithiocarbamate | ---- | ---- | ---- | ---- | ---- | 2.5 | ---- |
| 2-Mercaptobenzothiazole | ---- | ---- | ---- | ---- | ---- | ---- | 1.5 |
| Percent Gel | 0 | 0 | 0 | 103 | 105 | 99 | 100 |
| Percent Swell | ∞ | ∞ | ∞ | 310 | 475 | 220 | 270 |

[1] The amine from disproportionated rosin comprising a mixture of dehydroabietylamine and hydroabietylamines.

Examples 5–18

In these examples poly(epichlorohydrin) was compounded and cross-linked with combinations of agents including various amines. The amounts of the ingredients (by parts) in each formulation along with the extent of vulcanization are given in Table II.

TABLE II

| | Example No. | | | | | | | | | | | | | |
|---|---|---|---|---|---|---|---|---|---|---|---|---|---|---|
| | 5 | 6 | 7 | 8 | 9 | 10 | 11 | 12 | 13 | 14 | 15 | 16 | 17 | 18 |
| Poly(epichlorohydrin) (RSV-2.8) | 100 | 100 | 100 | 100 | 100 | ---- | ---- | 100 | 100 | ---- | 100 | ---- | 100 | 100 |
| Poly(epichlorohydrin) (RSV-1.9) | ---- | ---- | ---- | ---- | ---- | 100 | 100 | ---- | ---- | 100 | ---- | 100 | ---- | ---- |
| Dehydroabietylamine | 5 | | | | | | | | | | | | | |
| Tetrahydroabietylamine | | 5 | | | | | | | | | | | | |
| Piperidine | | | 5 | | | | | | | | | | | |
| Piperazine | | | | 5 | | | | | | | | | | |
| Collidine (2,4,6) | | | | | 5 | | | | | | | | | |
| Triethylamine | | | | | | 5 | | | | | | | | |
| Triethanolamine | | | | | | | 7.5 | 5 | | | | | | |
| Hexamethylenediamine carbamate | | | | | | | | | 5 | | | | | |
| Ethylenediamine | | | | | | | | | | 5 | | | | |
| Poly(2-methyl-5-vinyl-pyridine) | | | | | | | | | | | 10 | | | |
| Dicyclohexylethylamine | | | | | | | | | | | | 10 | | |
| Dicyclohexylamine | | | | | | | | | | | | | 5 | |
| Aniline | | | | | | | | | | | | | | 5 |
| Sulfur | 5 | 5 | 5 | 5 | ---- | 2 | .2 | 5 | 5 | 2 | ---- | 2 | 2 | ---- |
| 2-Mercaptobenzothiazole | ---- | ---- | ---- | ---- | ---- | 1.5 | 1.5 | ---- | ---- | 1.5 | ---- | 1.5 | 1.5 | ---- |
| Tetramethylthiuram disulfide | 2.5 | 2.5 | 2.5 | 2.5 | 2.5 | ---- | ---- | 2.5 | 2.5 | ---- | 2.5 | ---- | ---- | 2.5 |
| Percent Gel | 102 | 103 | 103 | 103 | 96 | 98 | 100 | 96 | 105 | 100 | 97 | 97 | 100 | 91 |
| Percent Swell | 755 | 490 | 1,000 | 360 | 715 | 480 | 210 | 670 | 350 | 125 | 320 | 135 | 115 | 1,050 |

The above examples show that cross-linking can be accomplished with many different amines in the combination of the invention.

Example 19

Poly(epichlorohydrin) (RSV—2.8) was compounded with Rosin Amine D and tetramethylthiuram disulfide with and without carbon black and silica and cross-linked by heating at 300° F. for 40 minutes. The formula used and the physical properties of the gum vulcanizate and carbon black vulcanizate so obtained are tabulated below:

| Composition: | | |
|---|---|---|
| Polymer | 100 | 100 |
| Rosin Amine D [1] | 5 | 5 |
| Tetramethylthiuram disulfide | 2.5 | 2.5 |
| Fast extruding furnace black | 12.5 | ---- |
| Silica (basic) | 12.5 | ---- |
| Physical Properties: | | |
| Tensile strength, p.s.i. | 1,620 | 520 |
| Ultimate elongation | 740 | 700 |
| Modulus 100% p.s.i. | 140 | 50 |
| Modulus 200% p.s.i. | 220 | 85 |
| Modulus 300% p.s.i. | 370 | 100 |
| Modulus 400% p.s.i. | 540 | 130 |
| Shore hardness A2 | 34 | 22 |

[1] See Example No. 1.

Example 20

A polymerization vessel with a nitrogen atmosphere was charged with 35 parts of n-heptane, 2 parts of epichlorohydrin and 8 parts of propylene oxide. After equilibrating at 30° C., a catalyst solution consisting of 0.79 part of triisobutylaluminum in n-heptane which had been reacted with 0.5 mole of acetylacetone per mole of aluminum and then with 0.5 mole of water per mole of aluminum, was added. After 6 hours at 30° C. the polymerization was stopped by adding 4 parts of anhydrous ethanol and the reaction mixture was diluted with an equal volume of diethyl ether. The reaction mixture was then washed with a 3% aqueous hydrogen chloride solution, with water until neutral, with a 2% aqueous sodium bicarbonate solution and again with water. After adding 4,4'-thiobis(6-tert-butyl-p-cresol) equal to 0.5% based on the polymer, the ether-in-heptane diluent was removed and the polymer was dried. The epichlorohydrin-propylene oxide copolymer so obtained was a tacky, snappy rubber that had an RSV of 5.7 and was soluble in benzene and n-heptane. A chlorine analysis showed that it contained 12% of the epichlorohydrin monomer.

This epichlorohydrin-propylene oxide copolymer was cross-linked by milling together 100 parts of the copolymer with 5 parts of Rosin Amine D and 2.5 parts of tetramethylthiuram disulfide and then heating as before. The vulcanizate so obtained had a percent gel of 87 and a percent swell of 1310 in comparison to 0 and ∞, respectively, for the control where no amine or thiuram disulfide was added.

Example 21

Poly(epichlorohydrin) (RSV—9.0) was compounded with tri-n-butylamine, sulfur, mercaptobenzothiazole, magnesium oxide and carbon black and cross-linked by heating at 310° F. for 40 minutes. The formula used and the physical properties of the vulcanizate are tabulated below:

| Composition: | |
|---|---|
| Polymer | 100 |
| High abrasion furnace black | 50 |
| Tri-n-butylamine | 5 |
| Sulfur | 2 |
| 2-mercaptobenzothiazole | 1.5 |
| Magnesium oxide | 5 |
| Physical properties: | |
| Tensile strength, p.s.i. | 1975 |
| Ultimate elongation, percent | 90 |
| Tear strength, p./i | 110 |
| Durometer hardness | 85 |

Examples 22–24

In these examples poly(epichlorohydrin) (RSV—2.8) was milled and cross-linked with various dithiocarbamates in combination with Rosin Amine D and compared to controls where no amine was added. The amounts of ingredients (by parts) used in each example are tabulated in Table III along with the extent of vulcanization.

TABLE III

|  | Example No. |  |  |  |  |  |
|---|---|---|---|---|---|---|
|  | 22 |  | 23 |  | 24 |  |
| Poly(epichlorohydrin) | 100 | 100 | 100 | 100 | 100 | 100 |
| Rosin Amine D [1] | 5 | | | 5 | | 5 |
| Zinc dimethyldithiocarbamate | 2.5 | 5 | | | | |
| Tellurium diethyldithiocarbamate | | | 2.5 | 5 | | |
| Piperidinium pentamethylene dithiocarbamate | | | | | 2.5 | 5 |
| Percent Gel | 95 | 0 | 99 | 0 | 95 | 0 |
| Percent Swell | 504 | ∞ | 220 | ∞ | 500 | ∞ |

[1] See Example No. 1.

That the other cross-linking agents are effective only when used in combination with an amine is obvious from the above data.

*Examples 25–27*

In these examples poly(epichlorohydrin) was milled and cross-linked (as described in Examples 1–4) with agents combining an amine, sulfur and either a thiuram sulfide, a thiazole or a dithiocarbamate and the extent of vulcanization compared with those formulations wherein the sulfur, thiuram sulfide, thiazole or dithiocarbamate was omitted. The amounts of the ingredients (by parts) in each formulation along with the percent gel and percent swell of each vulcanizate are given in Table IV.

TABLE IV

|  | Example No. |  |  |  |  |  |
|---|---|---|---|---|---|---|
|  | 25 |  | 26 |  | 27 |  |
| Poly(epichlorohydrin) (RSV–2.4) | 100 | 100 | | | | |
| Poly(epichlorohydrin) (RSV–1.4) | | | 100 | 100 | | |
| Poly(epichlorohydrin) (RSV–2.1) | | | | | 100 | 100 |
| Rosin Amine D [1] | 10 | 10 | | | | |
| Tri-n-butylamine | | | 10 | 10 | | |
| Cyclohexylamine | | | | | 10 | 10 |
| Sulfur | 5 | | 2 | | 2 | |
| Tetramethylthiuram disulfide | 2.5 | | | | | |
| 2-Mercaptobenzothiazole | | | 1.5 | | 1.5 | |
| Percent Gel | 103 | 0 | 100 | 0 | 100 | 0 |
| Percent Swell | 310 | ∞ | 270 | ∞ | 200 | ∞ |

[1] See Example No. 1.

It can be seen from the above examples that the combination of an amine with the other agents results in excellent vulcanizates but that the amine alone is ineffective.

*Examples 28 and 29*

These examples show the substitution of a metal oxide for a part of the amine component. In each example the polymer was milled with the specified agents and then cross-linked as described in Examples 1–4. One hundred (100) parts of poly(epichlorohydrin), (RSV–1.4) was cross-linked with 2 parts of sulfur, 1.5 parts of 2-mercaptobenzothiazole and varying amounts of amine and metal oxide. The amounts of the amine and metal oxide (by parts) in each formulation along with the extent of vulcanization are given in the table below.

TABLE V

|  | Controls |  |  | Example No. |  |  |  |  |  |
|---|---|---|---|---|---|---|---|---|---|
|  |  |  |  | 28 |  |  | 29 |  |  |
| Tri-n-butylamine | 2.5 | 5 | 10 | 2.5 | 5 | | 2.5 | 5 | |
| Zinc oxide | | | | 10 | 5 | 10 | | | |
| Magnesium oxide | | | | | | | 10 | 5 | 10 |
| Percent Gel | <10 | 88 | 100 | 94 | 100 | 0 | 100 | 98 | 0 |
| Percent Swell | | 560 | 270 | 660 | 340 | ∞ | 135 | 135 | ∞ |

It can be seen from the above examples that a metal oxide can be substituted for part but not all of the amine.

*Examples 30–35*

These examples demonstrate the cross-linking of poly(epichlorohydrin) (RSV—2.1) with cross-linking agents combining an amine and various thiazoles, thiurams and dithiocarbamates. The amounts of the ingredients used in each example (by parts) are tabulated in Table VI along with the extent of vulcanization.

TABLE VI

|  | Example No. |  |  |  |  |  |
|---|---|---|---|---|---|---|
|  | 30 | 31 | 32 | 33 | 34 | 35 |
| Poly(epichlorohydrin) | 100 | 100 | 100 | 100 | 100 | 100 |
| 2-Mercaptobenzothiazole | 1.5 | | | | | |
| 2-Benzothiazyl disulfide | | 2 | | | | |
| Tetramethyl thiuram disulfide | | | 1.5 | | | |
| Tetramethyl thiuram monosulfide | | | | 1.5 | | |
| Zinc dimethyl dithiocarbamate | | | | | 1.5 | |
| Tellurium diethyldithiocarbamate | | | | | | 1.5 |
| Sulfur | 2 | 2 | 2 | 2 | 2 | 2 |
| Tri-n-butylamine | 10 | 10 | 10 | 10 | 10 | 10 |
| Percent Gel | 100 | 102 | 103 | 105 | 100 | 104 |
| Percent Swell | 270 | 220 | 220 | 175 | 170 | 185 |

*Examples 36–38*

Poly(epichlorohydrin) (RSV—2.8) was compounded with tributylamine, sulfur and 2-mercaptobenzothiazole; tributylamine and sulfur; and tributylamine and 2-mercaptobenzothiazole, respectively, and cross-linked. The formulae (in parts) and the extent of vulcanization are tabulated below.

|  | Example No. |  |  |
|---|---|---|---|
|  | 36 | 37 | 38 |
| Polymer | 100 | 100 | 100 |
| Tri-n-butylamine | 10 | 10 | 10 |
| Sulfur | 2 | 2 | |
| 2-Mercaptobenzothiazole | 1.5 | | 1.5 |
| Percent Gel | 100 | 77 | 64 |
| Percent Swell | 270 | 370 | 375 |

It can be seen that cross-linking can be effected when employing an amine and either sulfur or 2-mercaptobenzothiazole, but improved results are obtained when using all three.

*Example 39*

Poly(epibromohydrin) (RSV—0.25) was prepared by the same general process as described previously for the prepartion of poly(epichlorohydrin).

This epibromohydrin polymer was cross-linked by milling together 100 parts of the polymer with 2 parts of sulfur, 1.5 parts of 2-mercaptobenzothiazole, 5 parts of magnesium oxide and 5 parts of tri-n-butylamine and then heating at 310° F. for 40 minutes. The vulcanizate so obtained had a percent gel of 91 and a percent swell of 104 in comparison to 0 and ∞, respectively, for the control where no cross-linking agents were added.

*Examples 40–42*

These examples demonstrate the tensile properties of some polymers and copolymers combined with reinforcing fillers and cross-linked in accordance with the invention. The amounts of the ingredients in each formulation (by parts) along with the physical properties of the vulcanizates obtained are tabulated below.

*Example 40*

| | |
|---|---|
| Poly(epichlorohydrin) (RSV—1.4) | 100 |
| Dicyclohexylethylamine | 10 |
| Tetramethylthiuram disulfide | 2.5 |
| Sulfur | 5 |
| Zinc oxide | 5 |
| Fast extruding furnace black | 30 |
| Tensile strength, p.s.i. | 2400 |
| Modulus at 200% elongation, p.s.i. | 1060 |
| Elongation, percent | 420 |

*Example 41*

| | |
|---|---|
| Copolymer (90% epichlorohydrin—10% epibromohydrin) (RSV—2.1) | 100 |
| Tri-n-butylamine | 10 |
| 2-mercaptobenzothiazole | 1.5 |
| Sulfur | 2 |
| Zinc oxide | 3 |
| Fast extruding furnace black | 30 |
| Tensile strength, p.s.i. | 1570 |
| Modulus at 200% elongation, p.s.i. | 1570 |
| Elongation, percent | 200 |

*Example 42*

| | |
|---|---|
| Copolymer (25% epichlorohydrin—75% ethylene oxide) (RSV—11.4) | 100 |
| Tri-n-butylamine | 10 |
| 2-mercaptobenzothiazole | 1.5 |
| Sulfur | 2 |
| Zinc oxide | 3 |
| Fast extruding furnace black | 30 |
| Tensile strength, p.s.i. | 4150 |
| Modulus at 200% elongation, p.s.i. | 565 |
| Elongation, percent | 1040 |

*Example 43*

This example demonstrates the unique properties of poly(epichlorohydrin) when it is combined with a reinforcing filler and cross-linked in accordance with this invention. One hundred (100) parts of poly(epichlorohydrin) (RSV—2.0) were milled with 50 parts of high-abrasion furnace black, 2 parts of sulfur, 10 parts of tri-n-butylamine, 1.5 parts of 2-mercaptobenzothiazole and 3 parts of zinc oxide and then heated for 40 minutes at 310° F. The properties of the vulcanizate are tabulated below.

At room temperature:

| | |
|---|---|
| Tensile strength, p.s.i. | 1,310 |
| Modulus at 100% elongation, p.s.i. | 355 |
| Elongation at break, percent | 300 |
| Bashore rebound, percent | 9 |
| Dur-Ometer hardness | 65 |

At 212° F.:

| | |
|---|---|
| Tensile strength, p.s.i. | 570 |

At room temperature after air oven aging, 24 hours at 250° F.:

| | |
|---|---|
| Tensile strength, p.s.i. | 1,080 |
| Modulus at 100% elongation, p.s.i. | 620 |
| Elongation at break, percent | 200 |
| Dur-Ometer hardness | 72 |

At reduced temperature:

Modulus of rigidity, p.s.i.—

| | |
|---|---|
| 60° C. | 170,000 |
| 40° C. | 170,000 |
| 30° C. | 68,000 |
| 20° C. | 46,000 |
| 10° C. | 945 |

Special properties:

| | |
|---|---|
| Heat build-up, ° F. | 23 |
| Mooney scorch, 5 point, min. | 16 |
| Mooney scorch, 10 point, min. | 20 |
| Mooney viscosity, ML4—212° F. | 17 |
| Compression set, percent | 26 |

Volume percent swell at room temperature:

| | |
|---|---|
| Gasoline | 11 |
| Motor Oil, SAE 10–20W | 4 |
| Water | 9 |
| Glycol antifreeze | 0 |
| Alcohol antifreeze | 24 |
| Turpentine | 22 |
| Kerosene | 4 |
| 10% aqueous sodium hydroxide | 0 |
| 10% aqueous sulfuric acid | 0 |

Volume percent swell at 250° F.:

| | |
|---|---|
| Motor oil, SAE 10–20W | 0 |
| Water (212° F.) | 9 |
| Glycol antifreeze | 4 |

As seen from the above tabulation, poly(epichlorohydrin) cross-linked in accordance with this invention combines excellent aging characteristics with high and low temperature performance, general elastomeric quality and resistance to both polar and nonpolar solvents. The resistance to solvents such as motor oil is outstanding when compared to the volume percent swell of general purpose SBR rubber, natural rubber and butyl rubber, all of which swell 100% or more when soaked in motor oil.

From the properties of the cross-linked polymers demonstrated in the examples, their value in specialty rubber applications can be seen, for instance, the polymers are useful in automotive and aircraft engine and body mounts, hoses, seals, gaskets, packings, rings, etc. Other uses will, of course, suggest themselves to the person skilled in the art.

This application is a continuation-in-part of my U.S. application Serial No. 738,650 filed May 29, 1958, now abandoned.

What I claim and desire to protect by Letters Patent is:

1. A cross-linked polymer of an epihalohydrin prepared by heating a polymer of an epihalohydrin, having a reduced specific viscosity of at least about 0.2 as measured on a 0.1% solution in α-chloronaphthalene at 100° C., in the presence of an amine and at least one other agent selected from the group consisting of sulfur, dithiocarbamates, thiuram sulfides and thiazoles, said epihalohydrin polymer containing before cross-linking a plurality of halomethyl groups attached to the main polymer chain and being selected from the group consisting of homopolymers of epihalohydrins and copolymers of an epihalohydrin with at least one other vicinal monoepoxide.

2. The product of claim 1 wherein the epihalohydrin polymer is a homopolymer of an epihalohydrin.

3. The product of claim 1 wherein the epihalohydrin polymer is a copolymer of an epihalohydrin with at least one other vicinal monoepoxide.

4. The product of claim 2 wherein the homopolymer is poly(epichlorohydrin).

5. The product of claim 2 wherein the homopolymer is poly(epibromohydrin).

6. The product of claim 3 wherein the copolymer is a copolymer of epichlorohydrin and propylene oxide.

7. The product of claim 3 wherein the copolymer is a copolymer of epichlorohydrin and epibromohydrin.

8. The product of claim 1 wherein the other agent is tetramethylthiuram disulfide.

9. The product of claim 1 wherein the other agent comprises mercaptobenzothiazole and sulfur.

10. The product of claim 1 wherein the other agent is tellurium diethyldithiocarbamate.

11. A cross-linked homopolymer of epichlorohydrin prepared by heating a homopolymer of epichlorohydrin, having a reduced specific viscosity of at least about 0.2 as measured on a 0.1% solution in α-chloronaphthalene at 100° C., with a polyalkylthiuram sulfide in the presence of an amine.

12. A cross-linked copolymer of epichlorohydrin and propylene oxide prepared by heating a coplymer of epichlorohydrin and propylene oxide, having a reduced specific viscosity of at least about 0.2 as measured on a 0.1% solution in α-chloronaphthalene at 100° C., with a polyalkylthiuram sulfide in the presence of an amine.

13. The product of claim 11 wherein the polyalkylthiuram sulfide is tetramethylthiuram disulfide.

14. The product of claim 12 wherein the polyalkylthiuram sulfide is tetramethylthiuram disulfide.

15. The process of cross-linking a polymer of an epihalohydrin having a reduced specific viscosity of at least about 0.2 as measured on a 0.1% solution in α-chloronaphthalene at 100° C., which comprises heating said polymer in the presence of an amine and at least one other agent selected from the group consisting of sulfur, dithiocarbamates, thiuram sulfides, and thiazoles, said epihalohydrin polymer containing before cross-linking a plurality of halomethyl groups attached to the main polymer chain and being selected from the group consisting of homopolymers of epihalohydrins and copolymers of an epihalohydrin with at least one other vicinal monoepoxide.

16. The process of claim 15 wherein the other agent is tetramethylthiuram disulfide.

17. The process of claim 15 wherein the other agent comprises mercaptobenzothiazole and sulfur.

18. The process of claim 15 wherein the other agent is tellurium diethyldithiocarbamate.

19. The process of claim 15 wherein the epihalohydrin polymer is a homopolymer of epichlorohydrin.

20. The process of claim 15 wherein the epihalohydrin polymer is a copolymer of epichlorohydrin and propylene oxide.

21. The process of cross-linking a poly(epichlorohydrin) having a reduced specific viscosity of at least about 0.5, as measured on a 0.1% solution in α-chloronaphthalene at 100° C., which comprises heating said polymer with a polyalkylthiuram sulfied in the presence of an amine.

22. The process of cross-linking a copolymer of epichlorohydrin and propylene oxide having a reduced specific viscosity of at least about 0.5, as measured on a 0.1% solution in α-chloronaphthalene at 100° C., which comprises heating said coplymer with a polyalkylthiuram sulfied in the presence of an amine.

23. The process of claim 21 wherein the polyalkylthiuram sulfide is tetramethylthiuram disulfide.

24. The process of claim 22 wherein the polyalkylthiuram sulfide is tetramethylthiuram disulfide.

References Cited in the file of this patent

UNITED STATES PATENTS 2,871,219     Baggett _____ Jan. 27, 1959